United States Patent [19]

Higuchi

[11] 3,760,805
[45] Sept. 25, 1973

[54] OSMOTIC DISPENSER WITH COLLAPSIBLE SUPPLY CONTAINER

[75] Inventor: Takeru Higuchi, Lawrence, Kans.

[73] Assignee: Alza Corporation, Palo Alto, Calif.

[22] Filed: Jan. 13, 1971

[21] Appl. No.: 106,131

[52] U.S. Cl................... 128/260, 128/130, 128/213
[51] Int. Cl........................................... A61m 31/00
[58] Field of Search ........... 128/127–131, 172, 213, 260, 261, 272, 271; 222/193, 389, 386.5, 386, 130, 105, 106, 94, 95, 97; 210/23

[56] References Cited
UNITED STATES PATENTS
3,561,644   2/1971   Works................................... 222/95
2,962,023   11/1960  Chappaz et al................. 128/271 X
3,306,503   2/1967   Page .............................. 222/386.5

OTHER PUBLICATIONS
Australian Journal of Experimental Biology, "Continuous Injector," Vol. 33, pp. 415–420 by S. Rose and J. F. Nelson.

Primary Examiner—Richard A. Gaudet
Assistant Examiner—J. C. McGowan
Attorney—Steven D. Goldby and Paul L. Sabatine

[57] ABSTRACT

An osmotic dispenser is comprised of (1) a water porous housing member confining (2) a first flexible bag of relatively impervious material containing an active agent and provided with active agent dispensing head, and (3) a second bag of controlled permeability to moisture containing a solution which exhibits an osmotic pressure gradient against water. The first and second bags are disposed within the housing member such that water permeates from the external environment through the housing and migrates by osmosis into the solution contained in the second bag which increases in volume thereby generating mechanical force on the first bag, which mechanical force in turn ejects the active agent out of the apparatus.

18 Claims, 4 Drawing Figures

INVENTOR
TAKERU HIGUCHI

OSMOTIC DISPENSER WITH COLLAPSIBLE SUPPLY CONTAINER

FIELD OF THE INVENTION

This invention relates to an osmotic dispenser, and, more especially, to an osmotic dispenser capable of releasing to its outside environment concentrations of active agent at an osmotically controlled rate over a prolonged period of time.

DEFINITION OF TERMS

The expression "active agent" as used herein denotes any drug (as defined, infra); composition in any way affecting any biological entity; substance having a nutrient or stimulating action, or growth inhibiting, destroying or any regulating action on plant growth, controlled or otherwise; substance to be assimilated by any organism, e.g., human being, animal, or lower order organism, for its nourishment or for regulating its growth; substance exhibiting any of the above activities to be directly applied to the habitat, surroundings or environment of any of the above organisms; and substance having any other effect on any other environment, especially any aqueous environment.

Therefore, suitable active agents for use with the dispenser of this invention include, without limitation, those which are generally capable of:

1. Preventing, alleviating, treating or curing abnormal and pathological conditions of the living body by such means as destroying a parasitic organism or limiting the effect of the disease or abnormality by chemically altering the physiology of the host or parasite;
2. Maintaining, increasing, decreasing, limiting or destroying a physiologic body or plant function, e.g., vitamin compositions, sex sterilants, fertility inhibitors, fertility promoters, growth promoters, and the like;
3. Diagnosing a physiological condition or state;
4. Controlling or protecting an environment or living body by attracting, disabling, inhibiting, killing, modifying, repelling or retarding an animal or microorganism, such as food and non-food baits, attractants and lures, biocides, pesticides, algicides, parasiticides, rodenticides, insecticides, fungicides and the like;
5. Preserving, disinfecting or sterilizing; and
6. Controlling or affecting generically an environment, as by introducing a catalyst or metering a reactant into a reacting chemical system, or by effecting any chemical process therein, such as a fermentation, including propagation and/or attenuation of a microorganism.

The terms "environment," "surroundings" and "habitat" as used hereinabove and herein denote any prospective situs for the osmotic dispenser of this invention, or at least for the water permeable membrane component thereof, which is comprised of or will provide sufficient water for absorption into the device to develop the needed osmotic pressure on which its motive force depends; and implicit in the foregoing definition of "active agent" — one that will develop its action in the presence of such environment, surroundings or habitat, or one that will develop its action in a remote and/or another environment, which need not be aqueous, as hereinafter described and illustrated.

BACKGROUND OF THE INVENTION

Many and varied compositions, products, appliances, depositors, applicators, dispensers, injectors and devices are well known in the art in which the timing or spacing of administration or absorption of an active agent is regulated by the structure or physical arrangement of elements so that a single administration provides a gradual but continuous or sustained feeding of the active agent to a system by slow or differential release. All of such prior art devices and the like, however, are characterized by at least one feature which adversely affects control over their rate of sustained or differential release or which detracts from the practical benefits attendant the longterm continuous administration of various active agents both to humans, animals, and into other environments.

An osmotic dispenser too has been proposed which is capable of delivering drug solution at a relatively constant rate. See Rose and Nelson, Austral. J. exp. Biol., 33, pp. 415 – 420 (1955). The Rose et al. injector consists of three compartments and a clamp to hold a semi-permeable membrane. The motive force of the injector depends on the osmotic pressure developed by a saturated aqueous solution of Congo red against water. This solution is contained in a partially collapsed rubber compartment and is separated from a second water compartment by the semi-permeable cellophane membrane. The partially collapsed bag is placed in a glass ampoule, with the drug compartment of the device being defined by the space between the Congo red bag and the glass ampoule. The ampoule is also provided with drug release means and when the drug compartment is charged with a drug solution water will move by osmosis into the Congo red solution, thus expanding the rubber compartment and providing the mechanical force to eject the drug out of the apparatus.

The Rose et al device, however, has substantial inherent disadvantages which has prevented its wide acceptance by the medical community. In the first place, the use of a solution as the drug vehicle (1) will not permit high concentration of drug to be embodied within the device; (2) such solutions exhibit the deleterious tendency to be released from the device by simple leaching; and (3) many chemical substances on prolonged storage in a dissolved state undergo chemical deterioration. The reference injector is moreover cumbersome in that it depends for its motive force on a separate water compartment rather than its environment. In addition, the Rose et al device is essentially only a research or experimentation tool, is complex in construction and is at least literally restricted to a Congo red solution to produce the osmotic driving force and to a cellophane osmotic membrane. See also Rose and Nelson, Austral, J. exp. Biol., 33 pp. 411 – 414 (1955).

SUMMARY OF THE INVENTION

Accordingly, it is a primary object of this invention to provide an osmotic dispenser which exhibits all of the practical benefits of long-term continuous administration of various active agents both to animals, humans, and into other environments.

Another object of this invention is to provide an improved osmotic dispenser which overcomes problems inherent in related devices heretofore proposed.

Another object of this invention is to provide an improved osmotic dispenser which will permit high concentrations of active agent to be embodied therein, and which high concentrations of active agent will neither exhibit the tendency to be leached from the device nor be decreased in potency by chemical breakdown.

Another object of this invention is to provide an osmotic active agent dispenser which depends for its motive force on its environment.

Still another object of this invention is to provide an osmotic dispenser, the osmotic membrane of which can be fabricated from many and varied suitable materials, and which is capable of using a variety of solutions of osmotically effective solutes to produce the osmotic driving force.

Yet another object of this invention is to provide an osmotic dispenser of simple design which will release active agent solution, or gel, or semisolid active agent formulation, at a controlled rate over a prolonged period of time.

In attaining the objects of this invention, one feature resides in an osmotic dispenser comprised of a water permeable housing member, advantageously rigid or otherwise shape retaining in nature, said housing member confining a first flexible bag of relatively impervious material containing the active agent, advantageously a drug, preferably in a gel, paste or other semisolid state (albeit a solution or concentrated solution of active agent will sometimes suffice), and a second bag of controlled permeability to moisture containing a solution of an osmotically effective solute which exhibits an osmotic pressure gradient against water. The said first and second bags are disposed within the said water permeable housing member or porous shell such that water permeates from the environment through the porous shell or housing and migrates by osmosis into the solution contained in the second bag. The solution in the second bag increases in volume, exerting mechanical force on the active agent containing first bag, which mechanical force in turn ejects the active agent out of the apparatus. For purposes of permitting the active agent to be squeezed out of the said first flexible bag, same is provided with any suitable active agent release means or dispensing head to the exterior of the device, e.g., long plastic tubing extending through the porous shell, or ductlike fine tubule connections through the said outer shell.

Other objects, features and advantages of this invention will become more apparent from the following description when taken in conjunction with the accompanying drawings, and wherein like reference numerals are used to indicate like or equivalent parts.

DETAILED DESCRIPTION OF THE INVENTION

Figure 1:
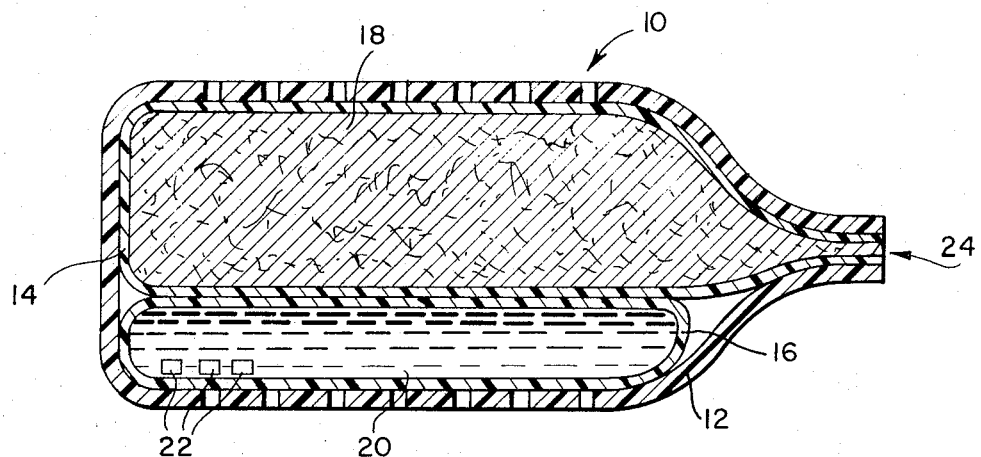
FIG. 1 is a cross-sectional view of an osmotic dispenser of this invention.

In one embodiment in accordance with this invention, as illustrated in FIG. 1, an osmotic dispenser 10 is comprised of a water permeable housing member or porous shell 12, advantageously rigid or otherwise shape retaining in nature, said shell confining in essentially parallel configuration a first flexible bag 14 or relatively impervious material and a second bag 16 of controlled permeability to moisture. The said first flexible bag 14 contains the active agent formulation 18, preferably in a gel, paste or other semisolid state. The said second bag 16 contains a solution 20 of an osmotically effective solute which exhibits an osmotic pressure gradient against water. Initially, the bag 16 will advantageously contain a saturated aqueous solution of the solute and excess solid solute 22. Active agent release means 24 provides communication from the interior of the bag 14 to the exterior of the device 10, in this instance the said means 24 being comprised of a narrowing neck in the porous shell 12 and an outlet in the bag 14 concentrically secured to the narrowing neck in the said shell 12. The said bag 16 is of closed construction, is initially partly collapsed within the shell 12, and when fully expanded will substantially fill the said shell.

To use the osmotic active agent dispenser of FIG. 1 wherein the several bags are arranged in parallel configuration, the device, when the active agent is a drug or other agent for treating, etc., a living organism, is either physically inserted or surgically implanted in the body of the organism, typically a mammal, or is administered via the gastrointestinal tract. Once in place, the second bag 16 expands through absorption of water from either body tissues or body fluids through the porous shell 12 and through the wall members thereof in an effort to reach osmotic equilibrium, i.e., a transition from hypertonicity to isotonicity. As the confined bag 16 expands, it exerts pressure against the likewise confined drug containing first flexible bag 14. Such pressure serves to squeeze out the drug content 18 of the bag 14 through the conduit 24. There is accordingly provided the gradual and controlled release of drug or similar agent directly to the body or affected organ thereof over a prolonged period of time. Since approximately one-half of the bag 16 will be exposed to moisture, relatively rapid rates of drug release are attainable. Moreover, the use of a semisolid drug vehicle will reduce the tendency to release the drug, or any other active agent for that matter, by leaching and will permit high concentrations thereof to be embodied within the device.

When the active agent is other than a drug or similar agent, or is intended for use other than in a living organism, the device is introduced into the desired aqueous environment to produce the desired effect exactly as would be any of the known means for accomplishing a like result. And this is generally a mere physical insertion, such as by placing a pesticide containing device in a river or stream, or a catalyst containing device in an aqueous reaction medium.

Figure 3:
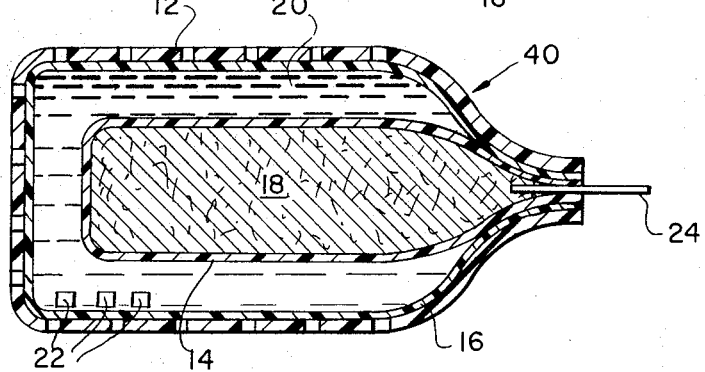
FIG. 3 is a cross-sectional view of another osmotic dispenser of this invention.

If desired, long flexible tubing of polythene or the like can be extended to the exterior of the device from the interior of the bag 14 through the means defined by the narrowing neck of the shell 12 and the outlet of the said bag 14 (see FIG. 3). In such manner the device can be deposited at a site remote from the desired point of application and still release its active agent contents through the tube directly to said point. This permits placement of the dispenser in an aqueous environment and release of the active agent into another environment, which need not be aqueous.

Figure 2:
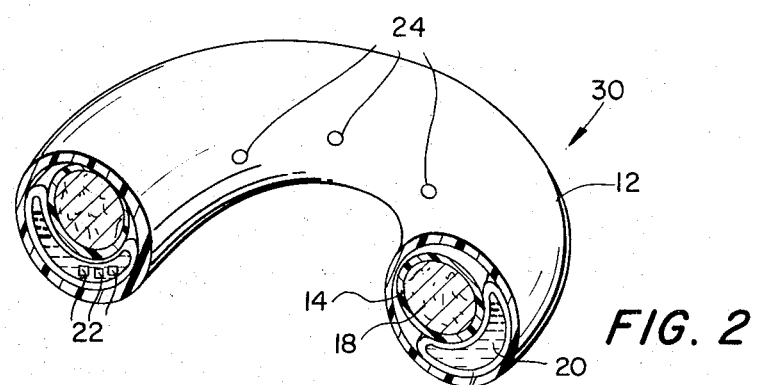
FIG. 2 is a partial perspective view, partially in cross-section, of an intravaginal device (IVD) embodying the principles of the osmotic dispenser of FIG. 1.

In FIG. 2 there is depicted an intravaginal device 30, ring-shaped, which will dispense drug formulation at an essentially constant rate based on the principle of the osmotic active agent dispenser of FIG. 1. This IVD embodiment is comprised of a ring-shaped, water permeable housing member or porous shell 12, again advantageously rigid or otherwise shape retaining in nature, and again confining in essentially parallel configuration a first flexible bag 14 of relatively impervious material and a second bag 16 of controlled permeability to moisture. The bag 14 contains the drug 18, preferably in a gel, paste or other semisolid state, and the bag 16 contains the solution 20 of the osmotically effective solute which exhibits an osmotic pressure gradient against water. Advantageously, the bag 16 contains a saturated solution of the solute and excess solid solute 22, to ensure that the solution remains saturated. At spaced intervals the bag 14 is provided with duct-like fine tubule connections through the outer shell 12 to permit release of the drug, illustrated in the drawing as release ports 24. For example, these fine tubine connections may take the form of a plurality of hard capillary nipples on the bag 14 extending through the shell 12.

The IVD of FIG. 2 is used by placing same around the cervix employing the usual techniques for positioning a cervical ring and, once in place, will release drug or a mixture of drugs at a closely regulated constant rate. Thus, it will be appreciated that mechanismwise the IVD of FIG. 2 is functionally equivalent to the osmotic active agent dispenser of FIG. 1.

Moreover, it will also be appreciated that, while in FIG. 2 there is depicted an IVD bottomed on the principle of the osmotic active agent dispenser of FIG. 1, the said principle of the invention applies equally as well to, for example, a device of a size, weight and shape as to be retained in the rumen of polygastric animals to release drug or similar agent thereto at a carefully controlled rate. A device of FIG. 1 type is admirably suited for the continuous administration of the antibiotic oxytetracycline to beef cattle from the rumen. Other variations on the basic theme would be readily apparent to the skilled artisan. Although particular configurations may be designed for specific body uses, each of these configurations is applicable to use in other environments.

In FIG. 3 another osmotic active agent dispenser 40 is shown, similar to that of FIG. 1, except that instead of the two separate bags arranged in more or less parallel configuration, a concentric design is illustrated. Such concentric design would be more effective and easier to fabricate. The embodiment of FIG. 3 provides for an interior, first flexible bag 14 of relatively impervious material containing active agent 18 (or agents) either as a solution, concentrated solution, or preferably as a semisolid gel, paste or cream with active agent suspended or dissolved therein. The bag 14 is disposed within a second bag 16 of controlled permeability to moisture, and the annular space therebetween is filled with the solution 20 of the osmotically effective solute to provide the needed osmotic pressure gradient or differential. This material, which must be nontoxic for drug or similar applications, preferably is present partly as an aqueous solution and partly as a solid 22. It can be seen that, in use, as water is absorbed from the outside aqueous environment through the porous shell and into the annular space, the contents of the bag 14 will be squeezed to the exterior of the device via the long plastic tubing 24, the length of which is directly proportional to reduction in the leaching effect heretofore mentioned.

In some instances, the device is of insufficient specific gravity to maintain the placement at the desired location. In those instances, a weight or ballast can be placed in the device. For this purpose, one can use iron plugs, iron ore tablets, brass plugs, or ceramic plugs. For use in the rumen, the weight should be sufficient to provide an effective specific gravity of greater than 1.5.

Optionally, a separator of porous paper, fabric or the like can be placed between the porous outer casing and the semi-permeable membrane bag. This prevents the membrane from being punctured or drawn into too tight a contact with the casing, thereby assuring that the entire membrane is exposed to the aqueous enviroment.

The impermeable bag 14 of the osmotic dispensers of the Figures of the drawing containing the active agent composition should be substantially impermeable both to water, and the other elements of the environment on which a device of such type is intended to be placed, the osmotically effective solute, and components of the active agent composition. Typical materials for use as the impermeable bag include polyethylene, polyethylene terephthalate (Mylar), plasticized polyvinyl chloride, metal-foil polyethylene laminates, neoprene rubber, natural gum rubber, and Pliofilm (rubber hydrochloride). These materials are additionally flexible, insoluble and chemically compatible with the active agent therein, and, in the instance of providing a drug or like depot within the body of a living organism, are biologically inert, non-irritating to body tissues and non-allergenic.

The membrane or second bag 16 can be formed from a wide variety of materials permeable or semi-permeable to solvent (water) but not to solute, i.e., those suitable for the construction of an osmotic cell. For best results, the membrane should be substantially impermeable to passage of the osmotically effective solute so as to prevent loss of the solute. Typical membranes are isotropic membranes such as unplasticized cellulose acetate, plasticized cellulose acetate, reinforced cellulose acetate, cellulose di- and triacetate, ethyl cellulose; anisotropic reverse osmosis membranes which typically are made of cellulose acetate; silicone rubbers, polyurethanes, natural rubber, and hydrolyzed ethylene/vinyl acetate copolymers. Isotropic membranes have less water permeability than do the anisotropic membranes. Also, with both types of membranes, increasing the acetate content of the cellulose acetate polymer decreases the water permeability. In one specific embodiment, the membrane used was an isotropic cellulose acetate membrane, with no plasticizer, having an acetate substitution of 2.4, being 3 mils thick, and passing water at the rate of 70 mg/cm$^2$ per day against a saturated solution of magnesium sulphate at 39° C. These membranes too are insoluble, and chemically compatible with the salt solution and excess solute therein and the material in the annular space between the two bags (FIG. 3). For drug depot applications as previously described same also are biologically inert, non-irritating to body tissues and non-allergenic. For devices designed to deliver active agents relatively rapidly for a limited period, membranes of controlled high water permeability are indicated: membranes of lower water permeability are used to provide slower and more prolonged delivery. At least in the embodiment of FIG. 1 where mechanical force is exerted by expansion of the bag 16, the membrane used should be flexible at least to the extent of permitting such expansion and the transmission of such mechanical force. This is unnecessary but acceptable in the embodiment of FIG. 3; for example, the bag 16 can be laminated at least in part to the porous shell.

Figure 4:
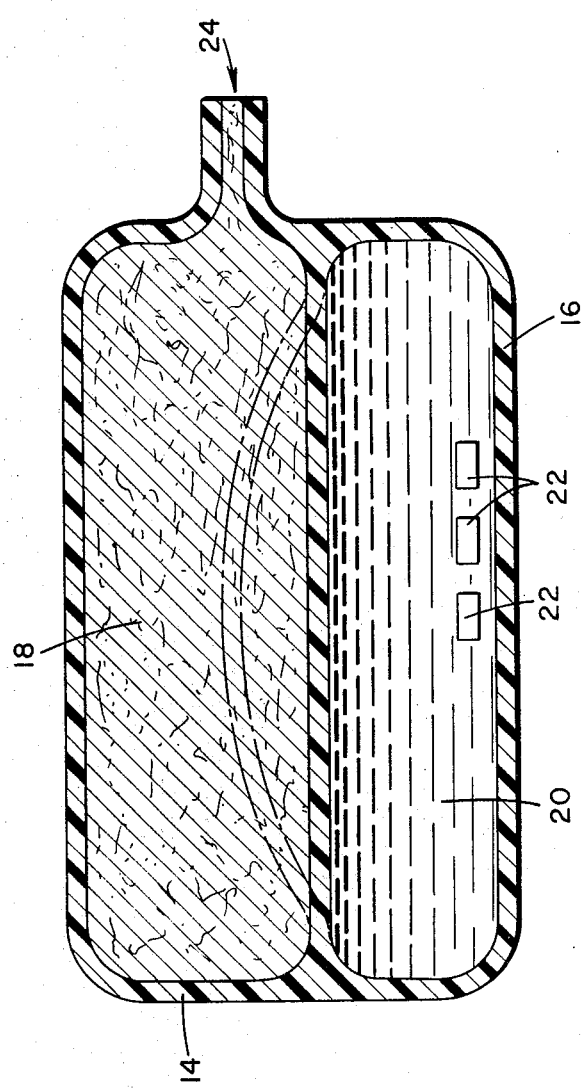

The porous casing too is insoluble and can be formed of perforated polystyrene, perforated polyethylene, perforated polypropylene, perforated polyvinyl chloride, perforated polymethylmethacrylate, etc., perforated sheet metal (e.g., aluminum, copper, steel, etc.), perforated galvanized pipe, perforated reinforced epoxy resin, metallic screen, sintered brass tubing, porous styrene/acrylonitrile copolymer, porous sintered polyethylene, or the like. It is not intended that the porous casing or pump body act as a barrier to the transport of water. Again, for drug depot applications the same is advantageously biologically inert, non-irritating to body tissues and non-allergenic. In the embodiment of FIG. 2 the ring-shaped shell 12 is advantageously of porous, hard plastic material, preferably of smooth exterior finish to reduce irritation. It will be appreciated that the said porous casing or shell need be rigid or otherwise shape retaining only to the extent of providing sufficient confinement for the two bags such that as one increases in volume the requisite corresponding pressure or force for active agent ejection is transmitted to or generated against the other. It will thus also be appreciated that it is within the scope of this invention to provide an osmotic dispenser devoid of the said casing member, as illustrated in FIG. 4, so long as the bags are so constructed and physically disposed relative to each other to permit of the aforesaid pressure generation and transmission, as, for example, a shape retaining balloon divided into the two bags or compartments by means of a flexible diaphragm. In this embodiment the active agent half of the balloon would be provided with a suitable dispensing head and the other half would contain the solution of the osmotically effective solute and would be fabricated at least in part from semipermeable materials.

Many other materials including those which are biologically acceptable are suitable for fabrication of the several component parts of the device of this invention. While the said several component parts of the device of the invention have previously been described as being insoluble under the conditions and in the environment of intended use, it is also within the scope of the invention that such materials be insoluble only during the period of said intended use; thereafter dissolving away in the environment of the device. Thus, a dispenser is here contemplated which is unaffected by its environment, solubility-wise, at the situs of use, or which is only slightly soluble during the period of intended use, such that once its active agent content has been discharged it will then dissolve or erode away leaving no objectionable residue or empty container at the said situs of use.

It is further within the scope of the invention to optionally provide the subject dispenser with a self-contained water supply or separate water compartment, as in the first mentioned Rose and Nelson publication, supra.

The relative thicknesses of the various membranes comprising the several bags of the invention, as well as the relative thickness of the porous shell can vary widely and are not limitations on the invention. Typically, however, the flexible active agent containing bag has a wall thickness of 0.5 to 50 mils and the water permeable membrane bag has a wall thickness of 1 to 10 mils.

One specific embodiment of a dispenser fabricated in accordance with the design illustrated in FIG. 1, fitted with a 2 mils thick flexible active agent bag 14 and a 3 mils thick semi-permeable membrane bag 16, both confined within a porous copper shell 12 having a density of at least 2.77, and having the following dimensions and specifications:

| | |
|---|---|
| OUter diameter of dispenser | 2.7 cm |
| Wall thickness of porous shell | 0.2 cm |
| Inner diameter of porous shell | 2.3 cm |
| Overall length | 6.5 cm |
| External volume | 37.2 cm |
| Internal volume | 25.3 cm |
| Overall dispenser density | $\geq 1.75$ |
| Available membrane area | 44.1 cm$^2$ |
| Active agent volume | 20.2 cm$^3$ |
| Active agent density | 1.2 |

Active agent: Approximately 60 percent tetracycline hydrochloride dispersed in 40 percent cocoa butter medium;

Osmotic solution: Saturated aqueous solution of $K_2SO_4$ containing sufficient excess solute in solid form to maintain solution saturated over a period of at least 3 days;

Water permeable membrane: Cellulose diacetate, with a degree of acetyl substitution of 2.4;

Active agent bag: Polyethylene;

is capable of deliverying 5 gm of the active drug per day, over a period of 3 days, when administered to the rumen of a 500 pound calf, whereat it is retained, via the gastrointestinal tract.

Any of the drugs used to treat the body, both topical and systemic, can be compartmentalized as the active agent in any of the osmotic dispensers of this invention. "Drug" is used herein in its broadest sense as including any composition or substance that will produce a pharmacological or biological response.

Suitable drugs for use in therapy with the dispenser of the invention include without limitation:

1. Protein drugs such as insulin;
2. Desensitizing agents such as ragweed pollen antigens, hay fever pollen antigens, dust antigen and milk antigen;
3. Vaccines such as smallpox, yellow fever, distemper, hog cholera, fowl pox, antivenom, scarlet fever, diptheria toxoid, tetanus toxoid, pigeon pox, whopping cough, influenzae, rabies, mumps, measles, poliomyletis, Newcastle disease, etc.;
4. Anti-infectives, such as antibiotics, including penicillin, tetracycline, chlortetracycline, bacitracin, nystatin, streptomycin, neomycin, polymyzin, gramicidin, oxytetracycline, chloramphenicol, and erythromycin; sulfonamides, including sulfacetamide, sylfamethizole, sulfamethazine, sulfadiazine, sulfamerazine, and sulfisoxazole; anti-virals including idoxuridine; and other anti-infectives including nitrofurazone and sodium;
5. Anti-allergenics such as antazoline, methapyrilene, chlorpheniramine, pyrilamine and prophenpyridamine;
6. Anti-inflammatories such as hydrocortisone, cortisone, hydrocortisone acetate, dexamethasone, dexamethasone 21-phosphate, fluocinolone, triamcinolone, medrysone, prednisolene, prednisolene 21-phosphate, and prednisolone acetate;
7. Decongestants such as phenylephrine, naphazoline, and tetrahydrozoline;
8. Miotics and anticholinesterases such as pilocarpine, eserine salicylate, carbachol, di-isopropyl fluorophosphate, phospholine iodide, and demecarium bromide;
9. Mydriatics such as atropine sulfate, cyclopentolate, homatropine, scopolamine, tropicamide, eucatropine, and hydroxyamphetamine;
10. Sympathomimetics such as epinephrine;
11. Sedatives and Hypnotics such as pentobarbital sodium, phenobarbital, secobarbital sodium, codeine,, (α-bromoisovaleryl) urea, carbromal;
12. Psychic Energizers such as 3-(2-aminopropyl) indole acetate and 3-(2-aminobutyl) indole acetate;
(13. Tranquilizers such as reserpine, chlorpromazine, and thiopropazate;
14. Androgenic steroids such as methyltestosterone and fluoxymesterone;
15. Estrogens such as estrone, 17 β-estradoil, ethinyl estradiol, and diethyl stilbesterol;
16. Progestational agents such as progesterone, megestrol, melengestrol, chlormadinone, ethisterone, norethynodrel, 19-norprogesterone, norethindrone, medroxyprogesterone and 17 α-hydroxyprogesterone;
17. Humoral agents such as the prostablandins, for example, $PGE_1$, $PGE_2$ and $PGF_2$,
18. Antipyretics such as aspirin, sodium salicylate, and salicylamide;
19. Antispasmodics such as atropine, methantheline, papaverine, and methscopolamine bromide;
20. Anti-malarials such as the 4-aminoquinolines, 8-aminoquinolines, chloroquine, and pyrimethamine;
21. Antihistamines such as diphenhydramine, dimenhydrinate, tripelennamine, perphenazine, and carphenazine;
22. Cardioactive agents such as hydrochlorothiazide, flumethiazide, chlorothiazide, and trolnitrate;
23 Nutritional agents such as vitamins, essential amino acids and essential fats;
24. Anti-parkinsonism agents such as L-dopa, (L-3,4-dihydroxyphenylalanine);
25. Investigative antihypotensive agents such as dopamine, 4-(2-aminoethyl) pyrocatechol.

Other drugs having the same or different physiological activity as those recited above can be employed in osmotic dispensers within the scope of the present invention. Suitable mixtures of drugs can, of course, be dispensed with equal facility as with single component systems.

Drugs can be in various forms, such as uncharged molecules, components of molecular complexes, or non-irritating, pharmacologically acceptable salts such as hydrochloride, hydrobromide, sulphate, phosphate, nitrate, borate, acetate, maleate, tartrate, salicylate, etc. For acidic drugs, salts of metals, amines, or organic cations (e.g., quaternary ammonium) can be employed. Furthermore, simple derivatives of the drugs (such as ethers, esters, amides, etc.) which have desirable retention and release characteristics but which are easily hydrolyzed by body pH, enzymes, etc., can be employed.

The amount of drug incorporated in the osmotic dispenser varies widely depending on the particular drug, the desired therapeutic effect, and the time span for which it takes the drug to be released. Since a variety of dispensers in a variety of sizes and shapes are intended to provide complete dosage regimes for therapy for a variety of maladies, there is no critical upper limit on the amount of drug incorporated in the dispenser. The lower limit too will depend on the activity of the drug and the same time span of its release from the dispenser. Thus is is not practical to define a range for the therapeutically effective amount of drug to be released by the dispenser.

The motive force of the dispenser of this invention depends on the osmotic pressure generated by the solution of the osmotically effective solute contained in the semi-permeable membrane or second bag 16, which solution exhibits an osmotic pressure gradient against water. Said solution is most preferably a saturated aqueous salt solution. To maintain the solution saturated and therefore to achieve a constant osmotic pressure throughout operation of the dispenser, the membrane or bag containing the solution also contains excess solute in solid form. Various osmotically effective solutes can be used. These include magnesium chloride, magnesium sulphate, sodium chloride, potassium sulphate, sodium carbonate, sodium sulphite, sodium sulphate, sodium bicarbonate, potassium acid phthalate, calcium bicarbonate, potassium acid phosphate, raffinose, tartaric acid, succinic acid, calcium succinate, calcium lactate, and magnesium succinate. The excess solid solute can be in the form of dispersed particles or preferably in the form of a pellet. The solution can initially be a solution of the same or of a osmoticaly effective solute different than the solid excess solute.

Active agent release means, other than those heretofore mentioned, can be a dispensing head which can take a variety of forms and can have varying numbers of orifices. In one embodiment such a head is formed of a relatively hard impact resistant material such as polyethylene, polypropylene, polystyrene, polymethylmethacrylate, or die cast metals. It is preferred that the construction of the said several bags and of the active agent release means be such that the osmotic driving pressure developed is at least ten times greater than the back pressure generated by the active agent formulation.

The osmotic dispenser can be fabricated in any convenient shape for either physical insertion or implanation in the body, or for administration via the gastrointestinal tract, or for introduction into any desired environment. Dimensions of the device can thus vary widely and are not of controlling importance. The lower limit of the size of the device is governed by the amount of the particular active agent to be supplied to the environment to elicit the desired response, as well as by the form of the dosage unit takes, for example, in cases of specific body uses, implantate, bolus, IUD, IVD, vaginal ring, uterine capsule for fertility suppression, artificial gland, prosthesis, pessary, suppository, and the like. Likewise with respect to the upper limit on the size of the device.

Thus, the invention provides, in an osmotic dispenser, a reliable means for releasing effective concentrations of active agent contained therein to the body of a living organism, or to any other environment, at an osmotically controlled rate and over a prolonged period of time. In addition, prime advantages of the dispenser of the invention are that it is simple in construction and exhibits all of the practical benefits of the long-term continuous administration of various active agents both to humans, animals, and into other environments, and that the active agent contained therein will not exhibit the tendency to be leached therefrom.

While the invention has been described and illustrated with reference to certain preferred embodiments thereof, those skilled in the art will appreciate that various modifications, changes, omissions, and substitutions can be made without departing from the spirit of the invention. It is intended, therefore, that the invention be limited only by the scope of the following claims.

What is claimed is:

1. An osmotic active agent dispenser comprising (1) a porous housing member affording free transport of water therethrough confining (2) a first flexible bag of relatively impervious material containing an active agent and provided with means for releasing the active agent to the exterior of the dispenser, and (3) a second bag comprised of membrane material having controlled permeability to water, being at least in part non-planar in configuration, and containing an osmotically effective solute which, in solution, exhibits an osmotic pressure gradient against water, the said bags (2) and (3) being disposed within the said housing member (1) such that the bag (2) is collapsibly responsive to an increase in volume in the bag (3) via absorption of water therein, whereby as water flows into the dispenser in a tendency towards osmotic equilibrium with its environment, active agent is continuously squeezed thereout at an osmotically controlled rate over a prolonged period of time.

2. The osmotic dispnser as defined by claim 1, wherein the active agent is selected from the group consisting of a drug and a bio-affecting composition.

3. The osmotic dispenser as defined by claim 1, wherein the active agent contained therein is in the form of a semisolid formulation.

4. The osmotic dispenser as defined by claim 1, wherein the solution exhibiting an osmotic pressure gradient against water is a saturated aqueous salt solution.

5. The osmotic dispenser as defined by claim 4, wherein the saturated salt solution contains excess solute in solid form.

6. The osmotic dispenser as defined by claim 1, wherein the first flexible bag (2) is comprised of a member selected from the grup consisting of polyethylene, polyethylene terephthalate, polyvinyl chloride, metal-foil polyethylene laminate, neoprene rubber, natural gum rubber and rubber hydrochloride.

7. The osmotic dispenser as defined by claim 1, wherein the second bag (3) is comprised of a member selected from the group consisting of cellulose acetate, silicone rubber, polxurethane, natural rubber and hydrolyzed ethylene/vinyl acetate copolymer.

8. The osmotic dispenser as defined by claim 1, wherein the housing member (1) is comprised of a member selected from the group consisting of perforated polystyrene, perforated polyethylene, perforated polypropylene, perforated polymethylmethacrylate, perforated polyvinyl chloride, perforated reinforced epoxy resin, perforated sheet metal, metallic screen, perforated galvanized pipe, porous sintered brass tubing, porous styrene/acrylonitrile copolymer, and porous sintered polyethylene.

9. The osmotic dispenser of claim 2 wherein the said housing member (1) is in the configuration of an intravaginal device, ring-shaped, and adapted to be placed around the cervix.

10. The osmotic dispenser of claim 2 wherein the said housing member (1) is in the configuration of a veterinary bolus.

11. The osmotic dispenser as defined by claim 1, wherein the bags (2) and (3) are disposed in an essentially parallel configuration.

12. The osmotic dispenser as defined by claim 1, wherein the bags (2) and (3) are disposed in an essentially concentric configuration.

13. The osmotic dispenser as defined by claim 1, wherein the osmotically effective solute is selected from the group consisting of magnesium chloride, magnesium sulphate, sodium chloride, potassium sulphate, sodium carbonate, sodium sulphite, sodium sulphate, sodium bicarbonate, potassium acid phthalate, calcium bicarbonate, potassium acid phosphate, raffinose, tartaric acid, succinic acid, calcium succinate, calcium lactate and magnesium succinate.

14. The osmotic dispenser as defined by claim 1, further comprising ballast means to adjust the specific gravity of the device.

15. The osmotic dispenser as defined by claim 14 having a specific gravity of greater than 1.5.

16. The osmotic dispenser as defined by claim 1, further comprising separator means disposed between the said housing member (1) and the said second bag (3).

17. The osmotic dispenser as defined by claim 9, further comprising a plurality of duct-like fine tubule connections through the said housing member (1) thereof.

18. An osmotic active agent dispenser comprising a shape retaining injector divided into two compartments by a flexible diaphragm, one of said compartments having an outer wall of relatively impervious material containing an active agent and provided with means for releasing the active agent to the exterior of the dispenser, and the other compartment having an outer wall of membrane material having controlled permeability to water, being at least in part non-planar in configuration, and containing an osmotically effective solute which, in solution, exhibits an osmotic pressure gradient against water whereby as water flows into the solute compartment in a tendency towards osmotic equilibrium with its environment, said diaphragm expands to continuously squeeze active agent from the dispenser at an osmotically controlled rate over a prolonged period of time.

* * * * *